(12) United States Patent
Kawajiri

(10) Patent No.: US 10,965,567 B2
(45) Date of Patent: Mar. 30, 2021

(54) IMAGE FORMING APPARATUS, CONTROLLING METHOD OF IMAGE FORMING APPARATUS, AND STORAGE MEDIUM

(71) Applicant: CANON KABUSHIKI KAISHA, Tokyo (JP)

(72) Inventor: Kensuke Kawajiri, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 203 days.

(21) Appl. No.: 16/011,918

(22) Filed: Jun. 19, 2018

(65) Prior Publication Data

US 2018/0375749 A1 Dec. 27, 2018

(30) Foreign Application Priority Data

Jun. 23, 2017 (JP) .............................. JP2017-123163

(51) Int. Cl.
| | | |
|---|---|---|
| *H04L 12/26* | (2006.01) | |
| *G06F 3/12* | (2006.01) | |
| *H04L 29/06* | (2006.01) | |

(52) U.S. Cl.
CPC ........ *H04L 43/0811* (2013.01); *G06F 3/1218* (2013.01); *G06F 3/1236* (2013.01);
(Continued)

(58) Field of Classification Search
CPC .... G06F 3/1218; G06F 3/1236; G06F 3/1253; G06F 3/1285; H04L 43/0811;
(Continued)

(56) References Cited

U.S. PATENT DOCUMENTS

| | | | | |
|---|---|---|---|---|
| 2013/0003106 A1* | 1/2013 | Nishida | ................. | G06F 3/1222 358/1.14 |
| 2013/0185573 A1* | 7/2013 | Okubo | ................. | G06F 1/3296 713/320 |

(Continued)

FOREIGN PATENT DOCUMENTS

JP        2014199998 A      10/2014

OTHER PUBLICATIONS

Candidate technical standard IPP Implementor's Guide v2.0 (IG) (Aug. 21, 2015) to Printer Working Group. ("PWG") (Year: 2015).*

*Primary Examiner* — June Y Sison
(74) *Attorney, Agent, or Firm* — Carter, DeLuca & Farrell LLP

(57) ABSTRACT

The present invention aims to prevent degradation of printing performance and also respond to a connection request. To do so, there is provided a controlling method for an image forming apparatus, comprising: determining whether or not a connection destination is a connection destination periodically transmitting a situation inquiry after transmitting data; and controlling to continue connection to the connection destination in a case where it is determined that the connection destination is the connection destination periodically transmitting the situation inquiry, and controlling to disconnect the connection to the connection destination in a case where it is determined that the connection destination is not the connection destination periodically transmitting the situation inquiry.

11 Claims, 6 Drawing Sheets

(52) U.S. Cl.
CPC .......... *G06F 3/1253* (2013.01); *G06F 3/1285* (2013.01); *H04L 43/10* (2013.01); *H04L 43/50* (2013.01); *H04L 69/16* (2013.01); *H04L 69/22* (2013.01); *H04L 69/28* (2013.01)

(58) Field of Classification Search
CPC ......... H04L 43/10; H04L 43/50; H04L 69/16; H04L 69/22; H04L 69/28
See application file for complete search history.

(56) References Cited

U.S. PATENT DOCUMENTS

| | | | |
|---|---|---|---|
| 2015/0043351 A1* | 2/2015 | Ohkawa | H04L 69/16 370/236 |
| 2015/0293729 A1* | 10/2015 | Sako | G06F 3/1229 358/1.15 |
| 2016/0323476 A1* | 11/2016 | Suzuki | H04N 1/2307 |

* cited by examiner

IMAGE FORMING APPARATUS, CONTROLLING METHOD OF IMAGE FORMING APPARATUS, AND STORAGE MEDIUM

BACKGROUND OF THE INVENTION

Field of the Invention

The present invention relates to an image forming apparatus, a controlling method of the image forming apparatus, and a storage medium of storing a program for performing the controlling method.

Description of the Related Art

Conventionally, in a printing apparatus or the like which prints out data, the apparatus is adapted to accept printing such as printing from a PC (personal computer), printing from a mobile terminal, and the like from a plurality of OSs (operation systems).

Some of such various printing paths inquire an execution situation of a job at high frequency. In this case, the printing apparatus must also perform response processes to the inquiries from the PC and the mobile terminal while executing a job process.

Furthermore, in recent years, it is common to use secure communication such as TLS (Transport Layer Security) for network connection between the PC or the mobile terminal and the printing apparatus. In this case, an SSL (Secure Sockets Layer) handshake process is necessary to decide an encryption form to be used at the start of communication.

For this reason, since the printing apparatus performs the SSL handshake process every time an inquiry is sent from the PC or the mobile terminal, the load for the response process to the inquiry increases more. As a result, degradation of printing performance occurs.

A process of transmitting a packet for maintaining a connection is known (Japanese Patent Application Laid-Open No. 2014-199998). It is possible to reduce the load for the response process by reducing the number of times of starting the communication with use of the technique of Japanese Patent Application Laid-open No. 2014-199998.

In the technique of Japanese Patent Application Laid-Open No. 2014-199998, although it is possible to reduce the number of times of starting the communication by the connection being maintained, there is a problem that the connection is occupied for a long time.

Since the number of the connections that the printing apparatus can hold at the same time is limited, if an unnecessary connection is maintained for a long period of time, it is impossible to respond to a connection request from the necessary PC or mobile terminal.

SUMMARY OF THE INVENTION

One aspect of an image forming apparatus of the present invention is characterized by comprising: a determining unit configured to determine whether or not a connection destination is a connection destination periodically transmitting a situation inquiry after transmitting data; and a controlling unit configured to continue connection to the connection destination in a case where it is determined by the determining unit that the connection destination is the connection destination periodically transmitting the situation inquiry, the controlling unit configured to disconnect the connection to the connection destination in a case where it is determined by the determining unit that the connection destination is not the connection destination periodically transmitting the situation inquiry.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

There are various printing methods such as printing using RAW, printing using IPP (Internet Printing Protocol) and the like.

In the first embodiment, the printing method of transmitting a print job to a printing apparatus using the IPP is defined as the method in which inquiries about a job situation frequently occur, whereas the other printing methods are defined as the methods in which inquiries about a job situation do not frequently occur.

Figure 1:
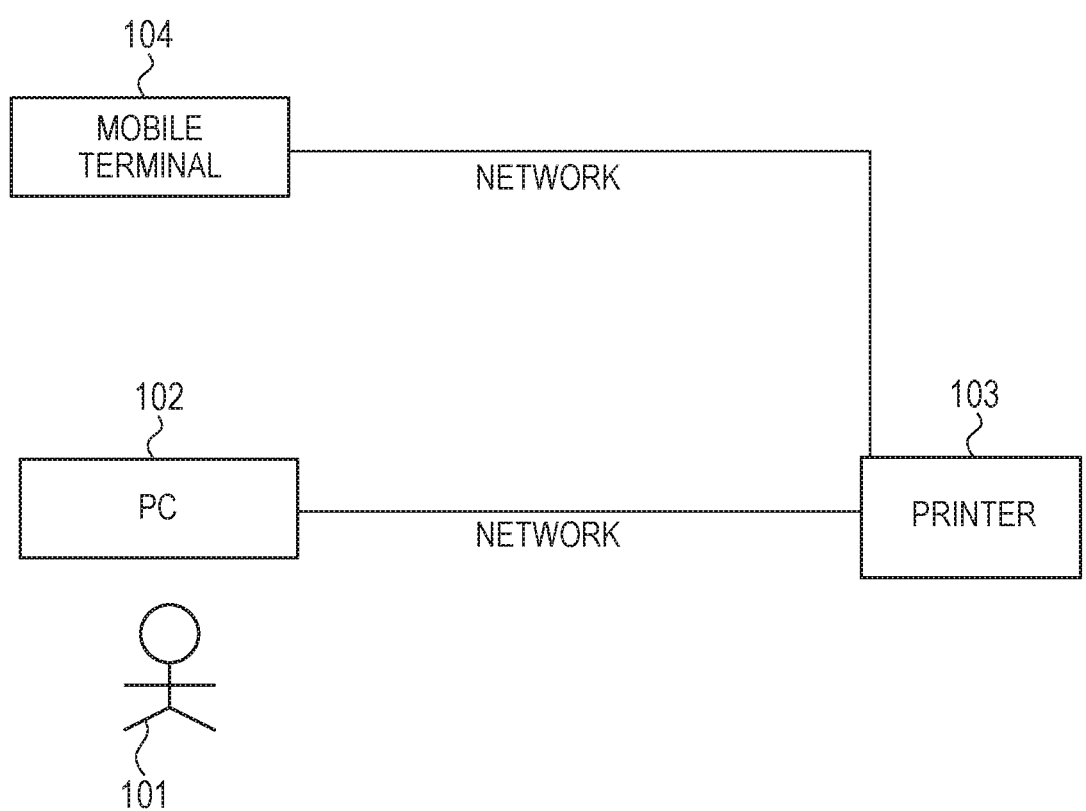
FIG. 1 is a diagram for describing an example of a system configuration of an information processing system.

FIG. 1 is a diagram for describing an example of a system configuration of an information processing system. In this system, a PC 102 and a mobile terminal 104 are connected to a printer 103 via a network. By operating the PC 102 or the mobile terminal 104, a user 101 can transmit print data from the PC 102 or the mobile terminal 104 to the printer 103, thereby performing printing. Here, it should be noted that each of the PC 102 and the mobile terminal 104 is an example of a connection destination (or an access point) of the printer 103. Besides, it should be noted that the printer 103 is an example of an image forming apparatus.

Figure 2:
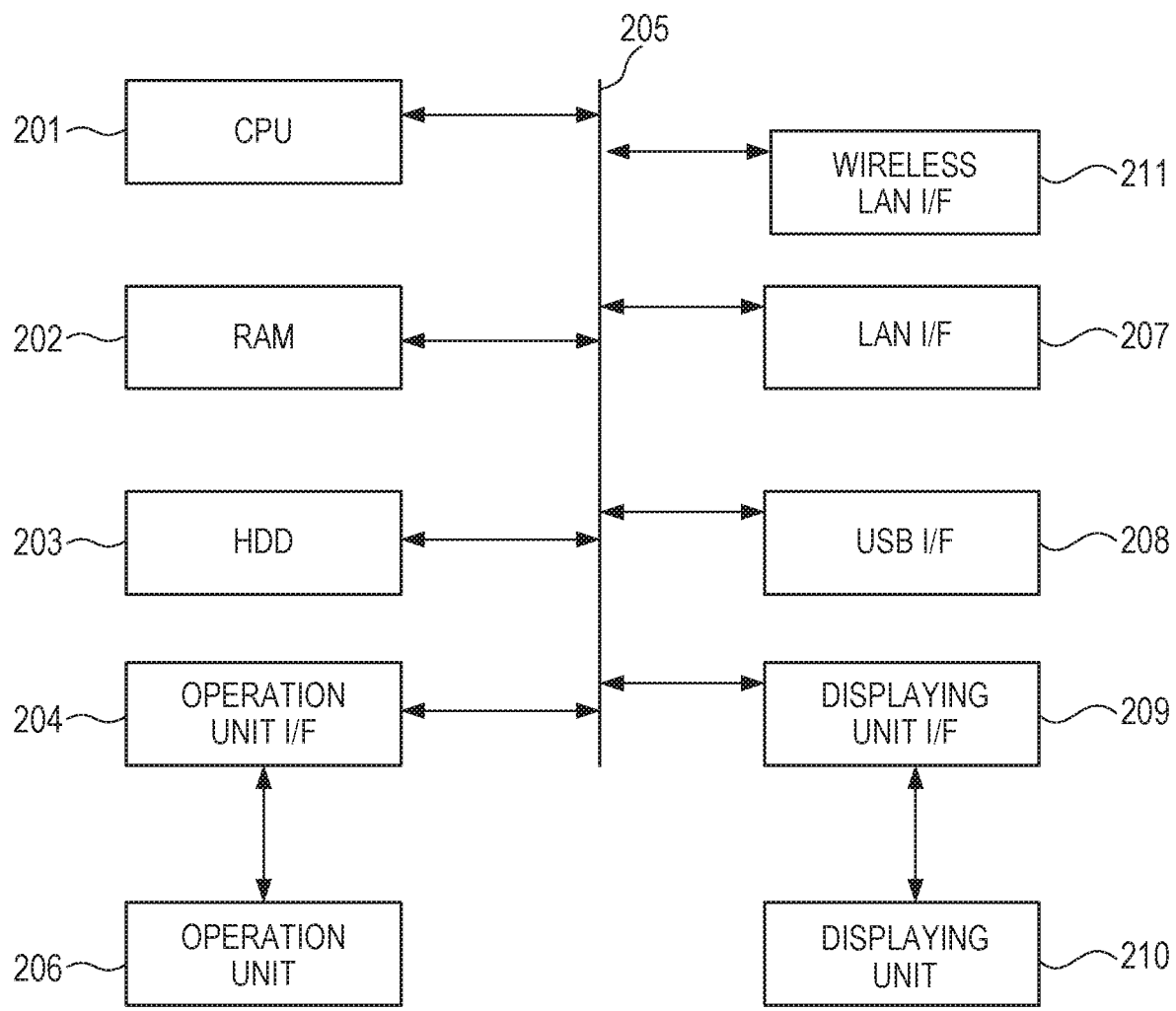
FIG. 2 is a diagram for describing an example of a hardware constitution of a PC and a mobile terminal.

FIG. 2 is a diagram for describing an example of a hardware constitution of the PC 102 and the mobile terminal 104. A CPU (central processing unit) 201 is a processor which entirely controls the information processing system. An RAM (random access memory) 202 is a system work memory for the CPU 201 to operate, and is used as a program memory for recording programs. An HDD (hard disk drive) 203 is a data storage area. An operation unit I/F (interface) 204 is an interface unit with an operation unit 206, and receives and accepts an input signal from the operation unit 206. Further, the operation unit I/F 204 serves to notify the CPU 201 of information input by the user from the operation unit 206. A displaying unit I/F 209 is an interface unit with a displaying unit 210, and outputs an output signal to the displaying unit 210 under the control of the CPU 201. A USB (universal serial bus) I/F 208 is a functional unit for connecting to a USB device, and is used for acquiring the status of another device and returning the status, via a USB. A LAN (local area network) I/F 207 is a functional unit for connecting to a LAN, and is used for acquiring the status of another device and returning the status, via the LAN. A wireless LAN I/F 211 is a functional unit for connecting to a wireless LAN. The above devices are respectively arranged on a system bus 205.

The function of the PC 102 is realized on the premise that the CPU 201 of the PC 102 performs a process based on the program stored in the HDD 203 or the like of the PC 102. Likewise, the function of the mobile terminal 104 is realized on the premise that the CPU 201 of the mobile terminal 104 performs a process based on the program stored in the HDD 203 or the like of the mobile terminal 104.

Figure 3:
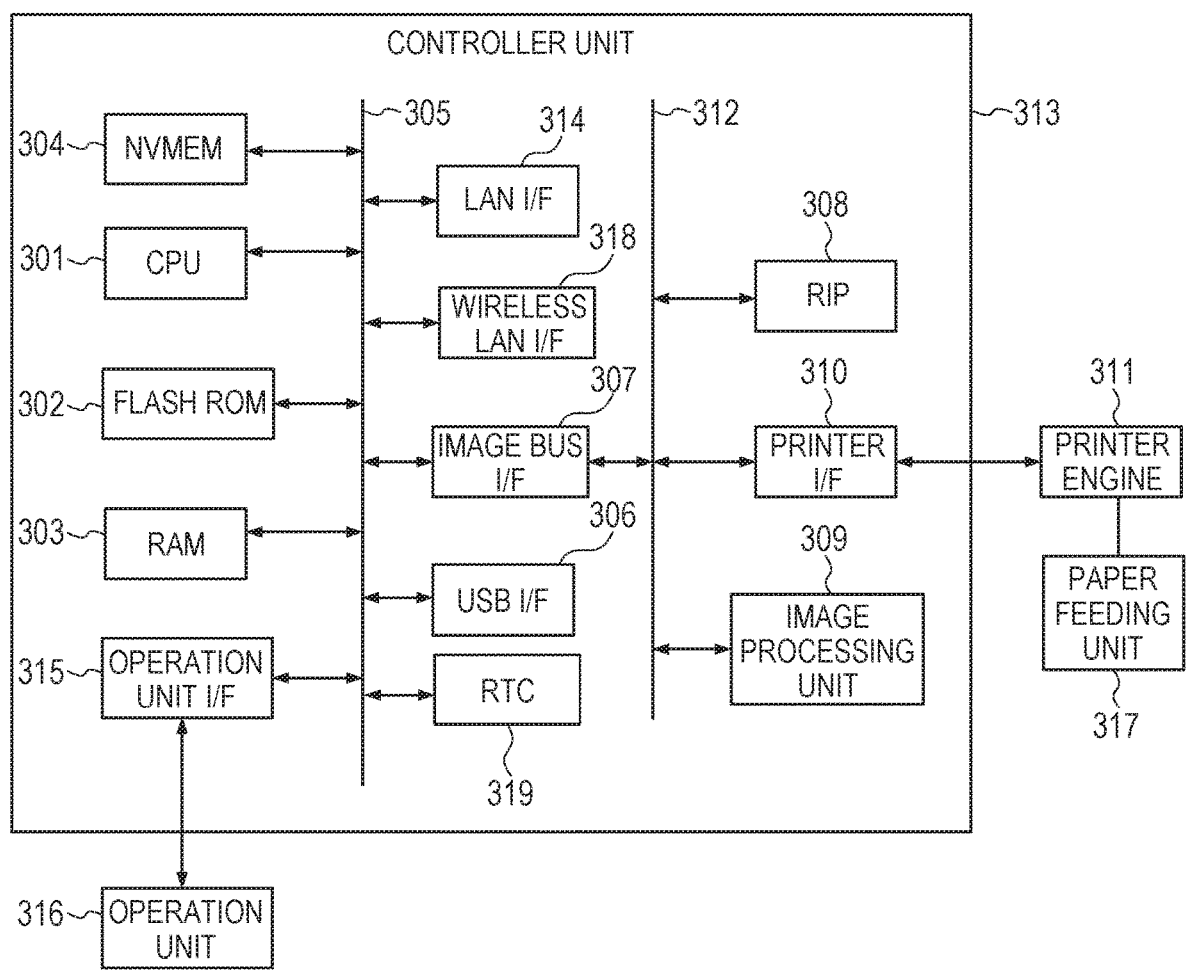
FIG. 3 is a diagram for describing an example of a hardware constitution of a controller unit of a printer.

FIG. 3 is a diagram for describing an example of a hardware constitution of the controller unit 313 of the printer 103.

A controller unit 313 inputs and outputs image data and device information by connecting to a printer engine 311 which functions as an image outputting device.

A CPU 301 is a processor which entirely controls the system.

A flash ROM (read only memory) 302 is a rewritable nonvolatile memory. Various control programs for controlling the system are recorded in the flash ROM.

An RAM 303 is a system work memory to be used by the CPU 301 to operate. Also, the RAM is a program memory for recording a program, and is an image memory for temporarily recording image data.

An NVMEM 304 is a nonvolatile memory which records setting information and the like.

A USB I/F 306 enables USB connection with the PC 102 or the like.

An image bus I/F 307 is a bus bridge which connects a system bus 305 with an image bus 312 of transferring image data at high speed, and is used to convert data structures.

An operation unit 316 holds keys for operating the device and LEDs (light-emitting diodes) indicating the states of the device.

An operation unit I/F 315 is an interface unit with the operation unit 316, and is used to transmit control information for the LED held by the operation unit 316. Besides, the operation unit I/F 315 serves to notify the CPU 301 of information input by the user from the operation unit 316.

A paper feeding unit 317 holds papers, and supplies (feeds) the paper to be used when the printer engine 311 performs printing.

An LAN I/F 314 enables LAN connection with the PC 102 and the mobile terminal 104.

A wireless LAN I/F 318 enables wireless LAN connection with the PC 102 and the mobile terminal 104.

An RTC 319 is a real time clock which is used for a clock function of the printer 103. The RTC 319 holds a battery, and thus maintains the operating even in a power-off state of the printer 103.

Such devices as described above are arranged on the system bus 305.

The image bus 312 is constituted based on a server I bus or IEEE (Institute of Electrical and Electronics Engineers) 1394.

Such devices as described below are arranged on the image bus 312.

An RIP (raster image processor) 308 develops vector data such as a PDL (page description language) code into a bitmap image.

A printer I/F 310 is used to connect the printer engine 311 and the controller unit 313 with each other, and performs synchronous/asynchronous conversion of the image data.

An image processing unit 309 corrects, processes, edits the input image data, and performs printer correction, resolution conversion and the like to the print output image data. In addition, the image processing unit performs a process of rotating the image data, performs a compressing/decompressing process such as a process of a JPEG (Joint Photographic Experts Group) format for multivalued image data, and performs compressing/decompressing processes such as a process of a JBIG (Joint Bi-level Image Experts Group) format, a process of an MMR (Modified Modified Read) format, a process of an MH (Modified Huffman) format and the like for binary image data.

The printer engine 311 converts raster image data into an image on paper.

Here, a printing operation is started by an instruction issued from the CPU 301.

Figure 4:
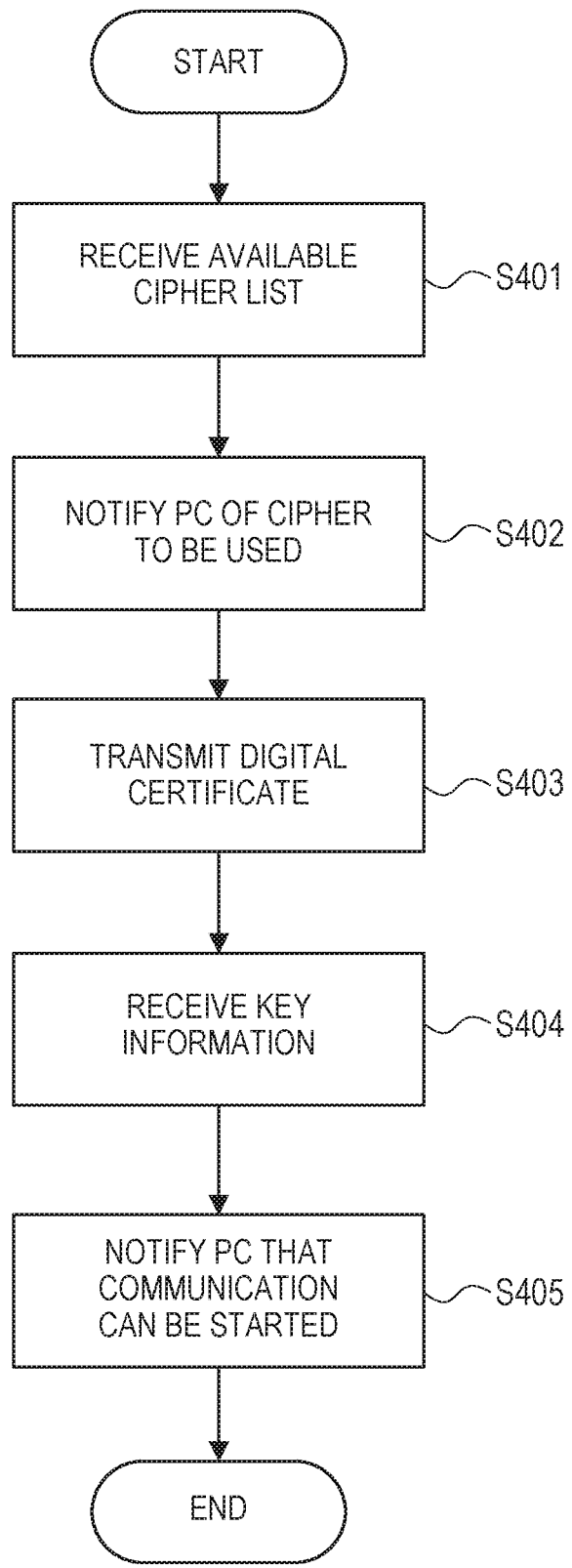
FIG. 4 is a flow chart for describing an example of an information process to be performed when a connection request is received.
Figure 5:
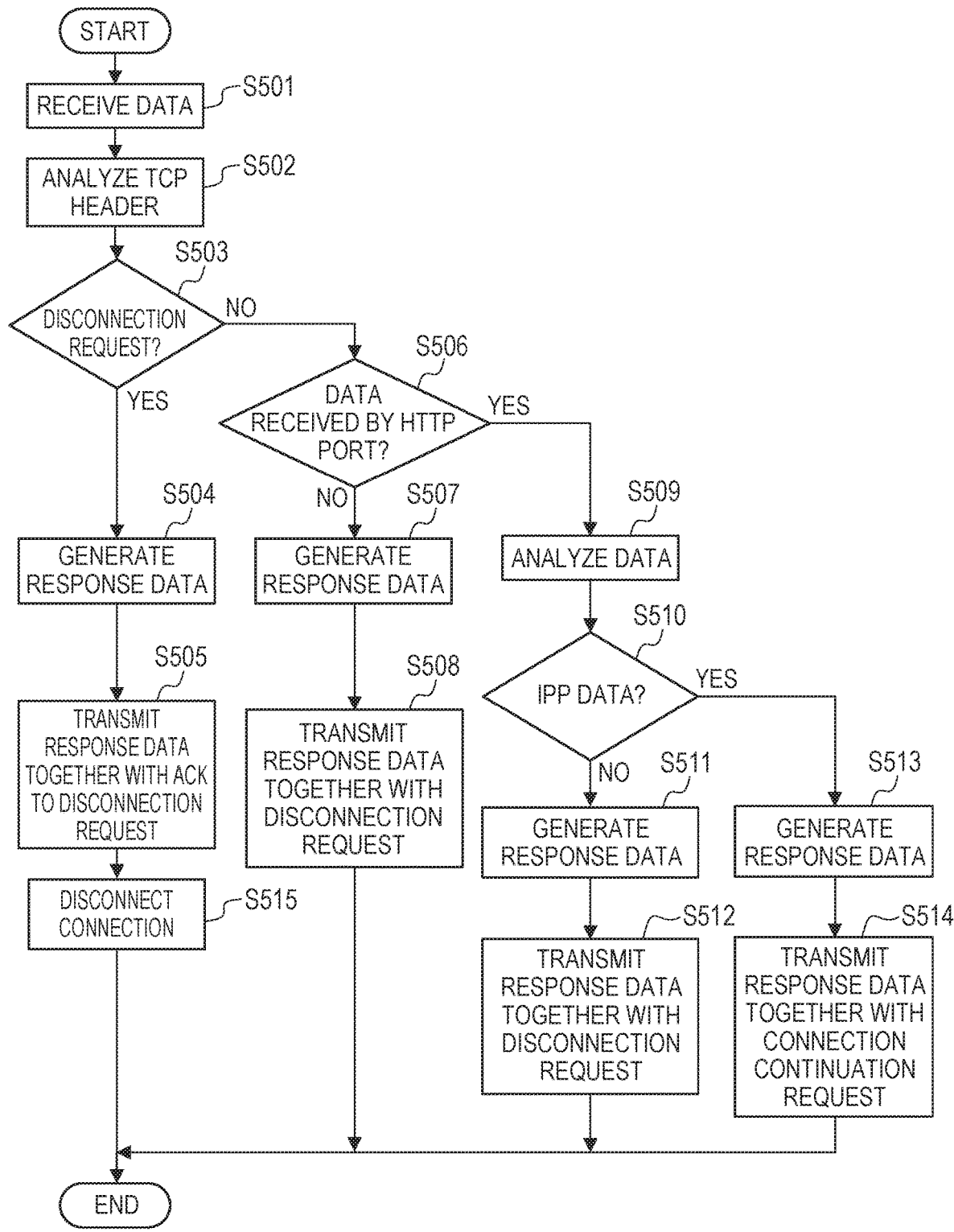
FIG. 5 is a flow chart for describing an example of an information process to be performed when data is received.
Figure 6:
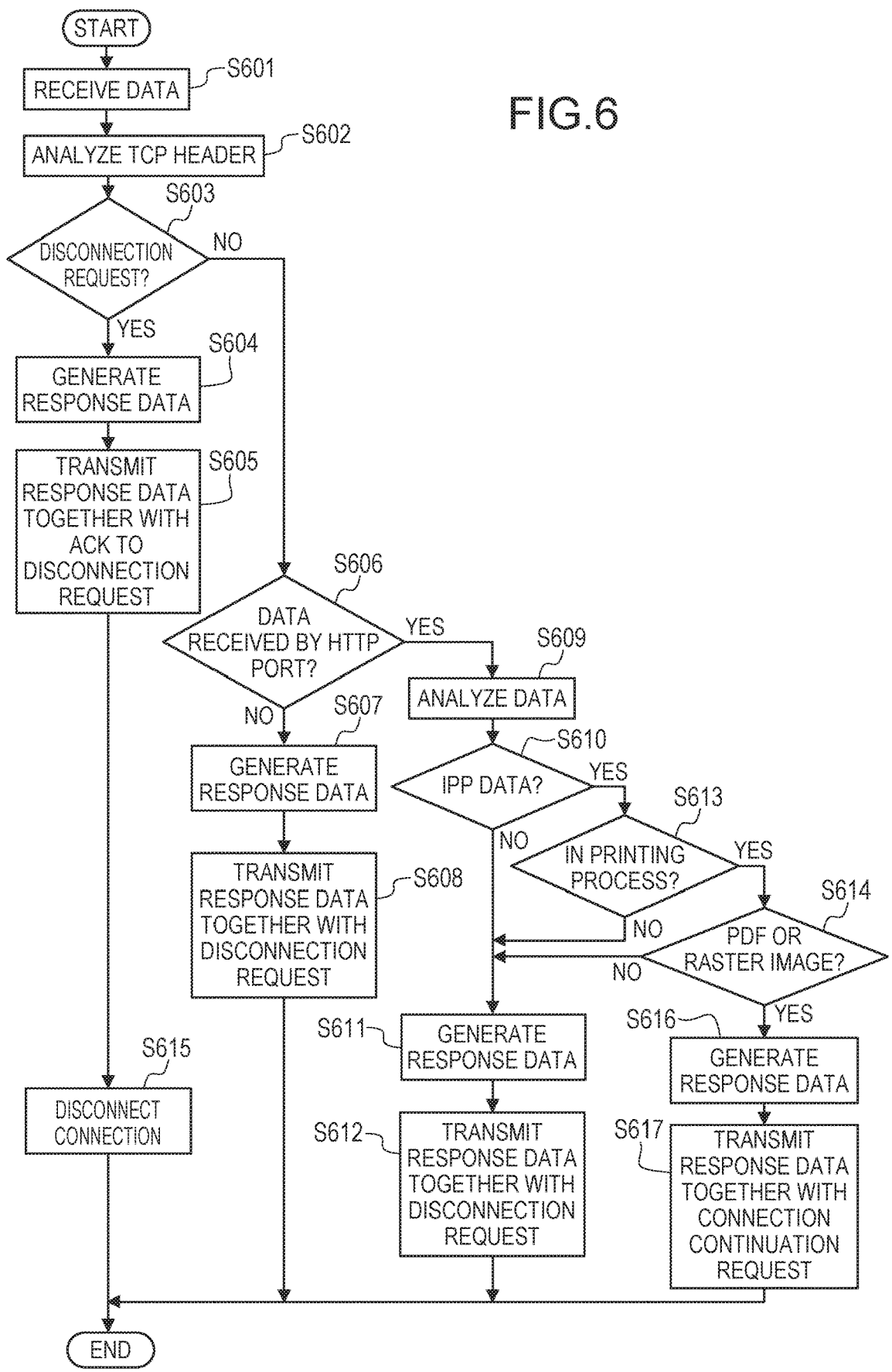
FIG. 6 is a flow chart for describing an example of the information process to be performed when data is received.

On the premise that the CPU 301 performs processes based on the program stored in the flash ROM 302 or the like, the functions of the printer 103 and processes described in flow charts of later-described FIGS. 4 to 6 are realized.

FIG. 4 is a flow chart for describing an example of an information process to be performed by the printer 103 when a connection request with the TLS is received from the PC 102.

In S401, the CPU 301 receives, together with the connection request, a cipher list which is available by the PC 102, via the wireless LAN I/F 318 or the LAN I/F 314.

In S402, the CPU 301 selects a cipher to be used from the received cipher list, and notifies the PC 102 of the selected cipher via the wireless LAN I/F 318 or the LAN I/F 314.

In S403, the CPU 301 transmits a digital certificate to the PC 102 via the wireless LAN I/F 318 or the LAN I/F 314.

In S404, the CPU 301 receives key information from the PC 102 via the wireless LAN I/F 318 or the LAN I/F 314.

In S405, the CPU 301 notifies the PC 102 that communication can be started, via the wireless LAN I/F 318 or the LAN I/F 314.

Thereafter, the PC 102 and the printer 103 can communicate with each other based on the TLS.

The process described by the flow chart of FIG. 4 is performed every time the connection request with the TLS is received from the PC 102.

Although the process of FIG. 4 is described as the process to be performed between the PC 102 and the printer 103, the same process can be performed even when the PC 102 is replaced with the mobile terminal 104.

FIG. 5 is a flow chart for describing an example of an information process to be performed by the printer 103 when data is received from the PC 102.

In S501, the CPU 301 receives data via the wireless LAN I/F 318 or the LAN I/F 314. Here, the received data is the print data or job situation inquiry data.

In S502, the CPU 301 analyzes the TCP (Transmission Control Protocol) header of the received data.

In S503, the CPU 301 determines, based on an analysis result, whether or not a disconnection request from the PC 102 is included in the received data. More specifically, the CPU 301 determines whether or not a FIN flag of the TCP header is ON. When the FIN flag of the TCP header is ON, the CPU 301 determines that the disconnection request is included in the received data. When the CPU 301 determines that the disconnection request is included in the received data (YES in S503), the process proceeds to S504. On the other hand, when the CPU determines that the disconnection request is not included in the received data (NO in S503), the process proceeds to S506.

In S504, the CPU 301 generates response data to the received data. In S505, the CPU 301 transmits, together with a response message (ACK) to the disconnection request, the generated response data to the PC 102.

In S515, the CPU 301 disconnects the connection with the PC 102.

In S506, the CPU 301 determines whether or not a port which received the data is an HTTP (HyperText Transfer Protocol) port. When the CPU 301 determines that the port which received the data is the HTTP port (YES in S506), the process proceeds to S509. On the other hand, when the CPU determines that the port which received the data is not the HTTP port (NO in S506), the process proceeds to S507. Here, it should be noted that the process of S506 is an example of a process of determining whether or not a connection destination is a connection destination periodically transmitting a situation inquiry after transmitting the data. More specifically, the process of S506 is an example of the process of determining, based on the port which received the data, whether or not the connection destination is the connection destination periodically transmitting the situation inquiry after transmitting the data.

In S507, the CPU 301 generates response data to the received data. In S508, the CPU 301 transmits, together with a disconnection request message, the generated response data to the PC 102. More specifically, the CPU 301 makes the FIN flag of the TCP header ON as the disconnection request message, and transmits the obtained flag to the PC 102. Here, the response data is response data which indicates that a job has been received, or response data which indicates a job situation.

In S509, the CPU 301 analyzes the received data. More specifically, the CPU 301 analyzes whether or not the received data includes IPP header information.

In S510, the CPU 301 determines whether or not the received data is IPP data, based on whether or not the IPP header information is included as a result of the analysis in S509. When it is analyzed in S509 that the IPP header information is included, the CPU 301 determines that the received data is the IPP data. When the CPU 301 determines that the received data is the IPP data (YES in S510), the process proceeds to S513. On the other hand, when the CPU determines that the received data is not the IPP data (NO in S510), the process proceeds to S511. Here, it should be noted that the process of S510 is an example of the process of determining whether or not the connection destination is the connection destination periodically transmitting the situation inquiry after transmitting the data. More specifically, the process of S510 is an example of the process of determining, based on whether or not the data is data transmitted according to a set protocol, whether or not the connection destination is the connection destination periodically transmitting the situation inquiry after transmitting the data.

In S511, the CPU 301 generates response data for the received data.

In S512, the CPU 301 transmits, together with the disconnection request message, the generated response data to the PC 102. More specifically, the CPU 301 makes the FIN flag of the TCP header ON as the disconnection request message, and transmits the obtained flag to the PC 102.

In S513, the CPU 301 generates response data for the received data.

In S514, the CPU 301 transmits, together with a message of a connection maintenance request or a connection continuation request (that is, a session maintenance request), the generated response data to the PC 102. More specifically, the CPU 301 makes the FIN flag of the TCP header OFF as the message of the connection maintenance request (the session maintenance request), and transmits the obtained flag to the PC 102.

Although the process of the flow chart illustrated in FIG. 5 is described as the process to be performed between the PC 102 and the printer 103, the same process can be performed even when the PC 102 is replaced with the mobile terminal 104.

Second Embodiment

In the first embodiment, the example of the information process to be performed by the printer 103 when the data is received from the PC 102 is described in the flow chart of FIG. 5. By the process like this, it is possible to limitedly maintain the connection only with respect to the port for which the inquiries about the job situation are frequently performed.

Incidentally, the printer 103 may determine whether or not to maintain the connection in accordance with whether or not the printing is in progress, and an image format of the data which is being printed.

There are the various printing methods such as the printing using the RAW, the printing using the IPP, and the like.

In the second embodiment, the printing method of transmitting a print job in a PDF (Portable Document Format) format or a raster image format to the printer 103 using the IPP is defined as the method in which inquiries about a job situation frequently occur, whereas the other printing methods are defined as the methods in which inquiries about a job situation do not frequently occur.

FIG. 6 is a flow chart for describing an example of the information process to be performed by the printer 103 when data is received from the PC 102.

Here, the respective processes of S601 to S608 are the same as the respective processes of S501 to S508 described in FIG. 5. Further, the process of S615 is the same as the process of S515 described in FIG. 5. Furthermore, the respective processes of S611 and S612 are the same as the respective processes of S511 and S512 described in FIG. 5. Furthermore, the respective processes of S616 and S617 are the same as the respective processes of S513 and S514 described in FIG. 5.

In S609, the CPU 301 analyzes the received data. More specifically, the CPU 301 analyzes whether or not the received data includes IPP header information. Besides, the CPU 301 analyzes whether or not the received data is the print data, and analyzes, when the received data is the print data, whether or not the received print data is the print data in the PDF format or the raster image format.

In S610, the CPU 301 determines whether or not the received data is IPP data, based on whether or not the IPP header information is included as a result of the analysis in S609. When it is analyzed in S609 that the IPP header information is included, the CPU 301 determines that the received data is the IPP data. When the CPU 301 determines that the received data is the IPP data (YES in S610), the process proceeds to S613. On the other hand, when the CPU determines that the received data is not the IPP data (NO in S610), the process proceeds to S611.

In S613, the CPU 301 determines whether or not a printing process is being performed. When the CPU 301 determines that the printing process is being performed (YES in S613), the process proceeds to S614. On the other hand, when the CPU determines that the printing process is not performed (NO in S613), the process proceeds to S611. For example, in a case where the printer engine 311 is performing the printing process, when data indicating that the printing process is being performed is set to the flag stored in the RAM 303 or the like, the CPU 301 determines that the printing process is being performed, based on the data set in the relevant flag. Besides, the CPU 301 may inquire of the printer engine 311 whether or not the printing process is being performed, and, based on a result of the inquiry, determine whether or not the printer engine 311 is performing the printing process.

In S614, the CPU 301 determines whether or not the image format of the data for which the printing process is being performed is the PDF format or the raster image format, based on the result of the analysis in S609. When the CPU 301 determines that the image format of the data for which the printing process is being performed is the PDF format or the raster image format (YES in S614), the process proceeds to S616. On the other hand, when the CPU 301 determines that the image format of the data for which the printing process is being performed is not the PDF format or the raster image format (NO in S614), the process proceeds to S611. Here, it should be noted that each of the processes of S613 and S614 is an example of the process of determining whether or not the connection destination is the connection destination periodically transmitting the situation inquiry after transmission the data. More specifically, each of the processes of S613 and S614 is an example of the process of determining, based on whether or not the data for which the printing process is being performed is the data having the set image format, whether or not the connection destination is the connection destination periodically transmitting the situation inquiry after transmitting the data.

Although the process of FIG. 6 is described as the process to be performed between the PC 102 and the printer 103, the same process can be performed even when the PC 102 is replaced with the mobile terminal 104.

As just described, according to each of the above embodiments, it is possible, by maintaining only the connection for which responses to the inquiries about the job execution situation are necessary with high frequency and disconnecting the other connections unless necessary, to improve printing performance without maintain the unnecessary connections.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-123163, filed Jun. 23, 2017, which is hereby incorporated by reference herein in its entirety.

What is claimed is:

1. An image forming apparatus comprising one or more processors configured to execute:
receiving a request for encrypted communication from an information processing apparatus;
establishing a session for the encrypted communication, based on the received request;
receiving print data with information set by a predetermined protocol from the information processing apparatus in the established session, and transmitting a notification not causing a disconnection of the session to the information processing apparatus; and
receiving print data without the information from the information processing apparatus in the established session, and transmitting a notification causing the disconnection of the session to the information processing apparatus.

2. The image forming apparatus according to claim 1, wherein the one or more processors are configured to execute:
determining whether or not the received print data is the print data with the information.

3. The image forming apparatus according to claim 1, wherein the predetermined protocol is IPP (Internet Printing Protocol).

4. A controlling method for an image forming apparatus, comprising one or more processors configured to execute:
receiving a request for encrypted communication from an information processing apparatus;
establishing a session for the encrypted communication, based on the received request;
receiving print data with information set by a predetermined protocol from the information processing apparatus in the established session, and transmitting a notification not causing a disconnection of the session to the information processing apparatus; and
receiving print data without the information from the information processing apparatus in the established session, and transmitting a notification causing the disconnection of the session to the information processing apparatus.

5. A non-transitory computer-readable storage medium storing a program for causing a computer to perform an information processing method to be performed by an image forming apparatus, the information processing method comprising:
receiving a request for encrypted communication from an information processing apparatus;

establishing a session for the encrypted communication, based on the received request;

receiving print data with information set by a predetermined protocol from the information processing apparatus in the established session, and transmitting a notification not causing a disconnection of the session to the information processing apparatus; and receiving print data without the information from the information processing apparatus in the established session, and transmitting a notification causing the disconnection of the session to the information processing apparatus.

6. The image forming apparatus according to claim 1, wherein the one or more processors are configured to execute:

receiving the print data with the information set by the predetermined protocol from the information processing apparatus in the established session, and transmitting a response to the print data, wherein, in the response, a predetermined flag is set to OFF.

7. The image forming apparatus according to claim 6, wherein the one or more processors are configured to execute:

receiving the print data without the information from the information processing apparatus in the established session, and transmitting the response to the print data, wherein, in the response, the predetermined flag is set to ON.

8. The image forming apparatus according to claim 1, wherein the one or more processors are configured to execute:

receiving a request causing the disconnection of the session from the information processing apparatus; and disconnecting the session based on the received request.

9. The image forming apparatus according to claim 7, wherein the predetermined flag is an FIN flag of a TCP header.

10. The image forming apparatus according to claim 1, wherein the one or more processors are configured to execute:

receiving an inquiry about a printing status based on the print data with the information set by the predetermined protocol received from the information processing apparatus, in the session same as the session used in the reception of the print data.

11. The image forming apparatus according to claim 1, wherein the one or more processors are configured to execute:

determining whether or not the information set by the predetermined protocol has been set to a header added to the received print data.

* * * * *